United States Patent
Booth, Jr.

(10) Patent No.: US 6,469,756 B1
(45) Date of Patent: Oct. 22, 2002

(54) COMPENSATING FOR APERTURE PARALLAX DISTORTION IN TILED DISPLAYS

(75) Inventor: Lawrence A. Booth, Jr., Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 09/716,138

(22) Filed: Nov. 17, 2000

(51) Int. Cl.[7] .................. G02F 1/133; G02F 1/1335; G02F 1/1343; G09G 3/36
(52) U.S. Cl. .................. 349/73; 349/106; 349/109; 349/139; 345/88
(58) Field of Search .................. 349/73, 139, 143, 349/144, 106, 109; 345/88, 89, 87, 22

(56) References Cited

U.S. PATENT DOCUMENTS

| | | | | |
|---|---|---|---|---|
| 5,661,531 A | * | 8/1997 | Greene et al. | 349/73 |
| 6,014,193 A | * | 1/2000 | Taira et al. | 345/90 |
| 6,100,861 A | * | 8/2000 | Cohen et al. | 345/88 |
| 6,184,953 B1 | * | 2/2001 | Greene et al. | 345/88 |

* cited by examiner

Primary Examiner—William L. Sikes
Assistant Examiner—Tarifur R. Chowdhury
(74) Attorney, Agent, or Firm—Trop, Pruner & Hu, P.C.

(57) ABSTRACT

A tiled display may include subpixels that may be partially occluded by an overlaying matrix. The matrix hides the joints between adjacent tiles. The partial occlusion of one subpixel of a pixel may result in chromatic shifts and/or luminance reduction. The partially occluded subpixel may be compensated for by providing an extra light producing subpixel of the same color on the opposite side of the matrix opening.

21 Claims, 2 Drawing Sheets

COMPENSATING FOR APERTURE PARALLAX DISTORTION IN TILED DISPLAYS

BACKGROUND

This invention relates generally to tiled displays made up of a plurality of tiles that collectively display a composite image.

In most tiled displays, a matrix overlays the individual tiles which collectively form the display. The matrix generally hides or occludes the joint between adjacent tiles. Each tile may include one or more pixels. Each pixel in turn may be formed by a plurality of color producing elements. The color producing elements may produce the three colors associated with conventional color spaces such as the red green blue (RGB) color space as one example.

In some cases, the matrix overlaying the pixels may occlude one or more colors produced by the color producing elements. This may result in luminance loss or chromatic shifts. For example, in a red green blue system, if a blue subpixel of a particular pixel is occluded at a particular viewing angle, the overall pixel may appear shifted towards yellow. Also, the resulting reduction in the blue light may result in loss of luminance to the viewer.

Thus, from particular viewing angles, the display may appear chromatically shifted or luminance levels may be lost at least around edges adjacent to the matrix.

Displays that may be partially occluded by the matrix may be described as having an aperture parallax limit. In other words, at some angles, through the aperture formed by the matrix into one or more pixels, there may be an angle beyond which the displayed image may be distorted. The distortion may appear as a luminance reductions or chromatic shift as two examples.

Thus, there is a need for a way to improve distortions that arise in tiled displays.

DETAILED DESCRIPTION

Figure 1:
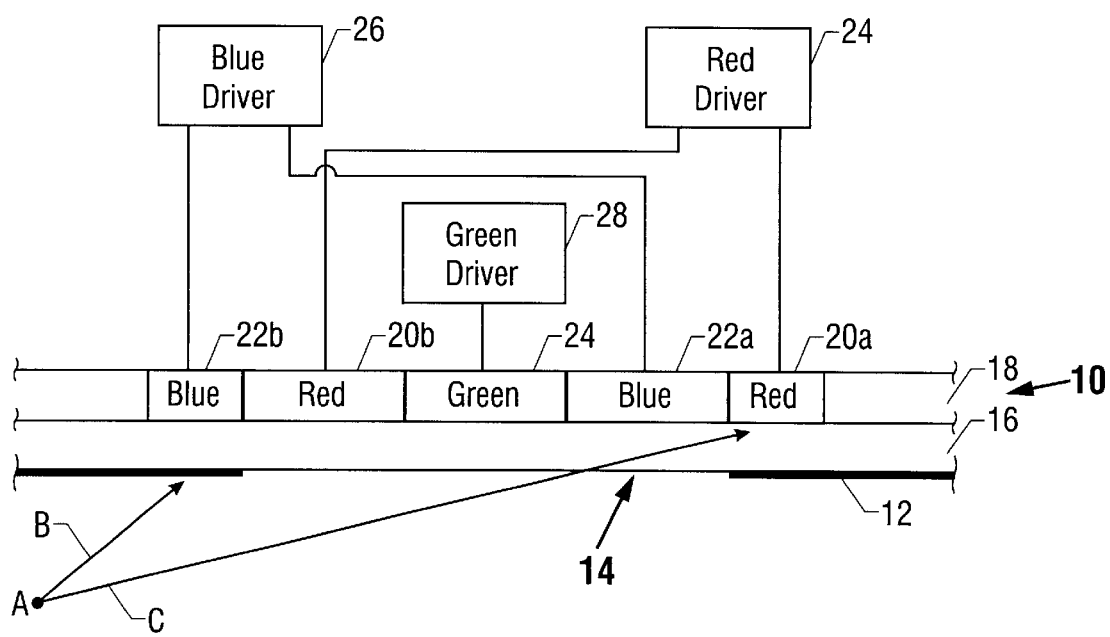
FIG. 1 is a schematic depiction of one embodiment of the present invention.

Referring to FIG. 1, a tiled display 10 may include a layer 18 which has formed therein a plurality of color producing elements 20, 22 and 24. In one embodiment, the elements 20 produce red light, the element 24 produces green light and the elements 22 produce blue light. The color producing elements 20, 22 and 24 may be light emissive elements such as inorganic or organic light emitting devices (OLEDs) or field emissive devices as two examples. As another example, the elements 20, 22 and 24 may be absorptive or contrast enhancing elements that alter or modulate light passing through them, such as liquid crystal display (LCD) devices. Thus, each element 20, 22 or 24 "produces" light of a particular color for example by emitting, selectively passing an absorbing light.

A variety of color spaces may be utilized to form the display 10. In one embodiment, a red green blue (RGB) color gamut is utilized but other known color gamuts may be used as well. In conventional color gamuts, three different color producing elements or subpixels form an individual pixel. By altering the mix of colors produced by the color producing elements 20, 22 and 24, the user can perceive an overall scene made up of a plurality of pixels of the desired colors.

Figure 2:
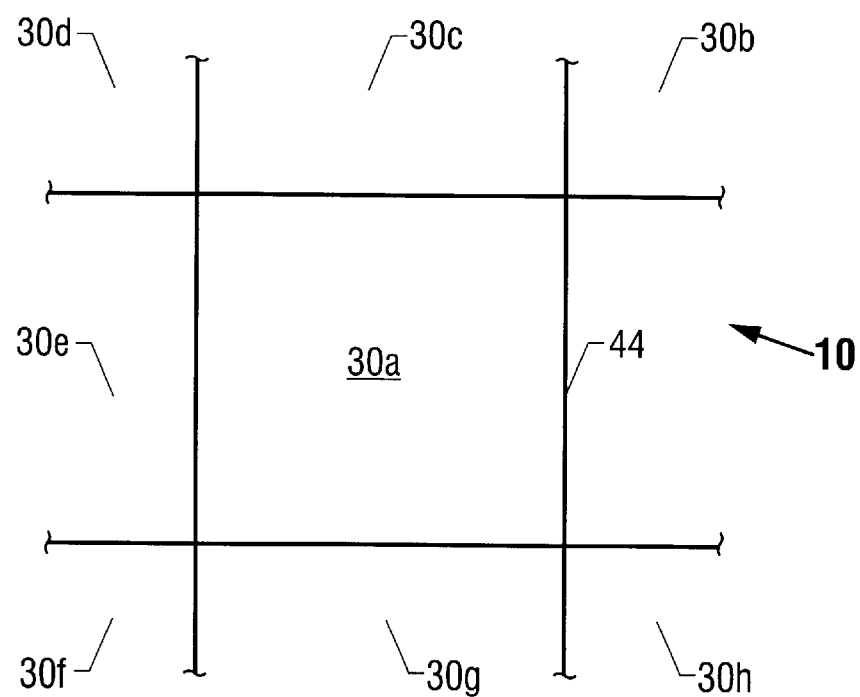
FIG. 2 is a top plan view of the display shown in FIG. 1 before the matrix is applied.

In a tiled display 10, a plurality of display tiles 30a–h may be butted together, as illustrated in FIG. 2. The joint 44 shown between adjacent tiles 30 may be occluded by the matrix 12 shown in FIG. 1. The matrix 12 generally functions to occlude the joint 44 in an non-obtrusive fashion.

Figure 3:
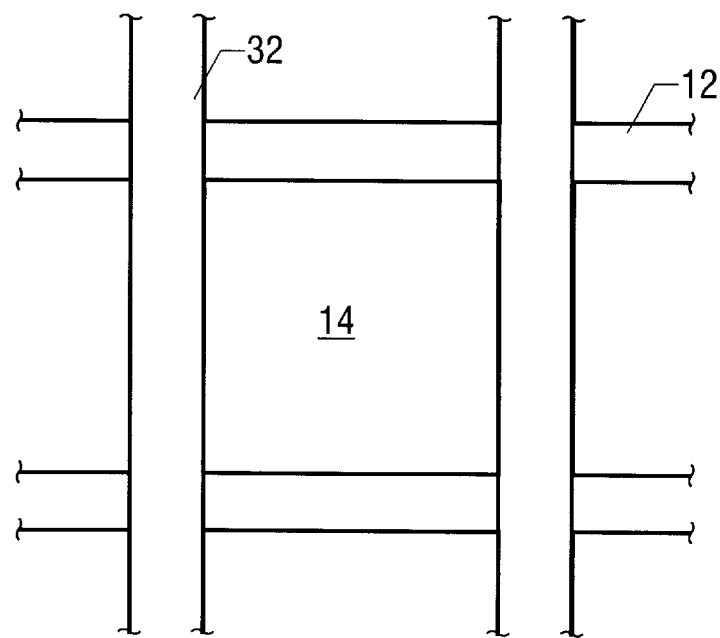
FIG. 3 is an enlarged, partial, top plan view of the embodiment shown in FIG. 1.

As illustrated in FIG. 3, the matrix 12 not only covers the joint 44 but also divides each tile 30, which may include a large number of pixels, into pixel-sized openings 14. Thus, a viewer may not notice that the overall display 10 is made up of a plurality of tiles 30 including a large number of pixels defined by apertures 14 in the matrix 12.

The tiles 30 may be unified by a substantially transparent sheet 16 shown in FIG. 1. The sheet 16 may be a glass sheet in one embodiment. The sheet 16 spaces the layer 18 from the matrix 12.

In one embodiment, shown in FIG. 3, the matrix 12 may be formed of a plurality of intersecting, perpendicular strips 32 that define a plurality of pixel-sized openings 14 over each tile 30. The viewer perceives the image from the display 10, not as a collection of images created through the openings 14, but ideally as a unitary display image.

However, a parallax effect may result when a viewer is positioned at an angle with respect to an opening 14. For example, a viewer may view a pixel made up of subpixels formed by the red 20b, green 24 and blue 22a elements, from the position, as shown in FIG. 1, A. The viewer may have only an occluded view of the red light producing element 20b. As a result, a luminance loss and/or a chromatic shift may result. However, by including an extra red color producing element 20a on the opposite side of the opening 14, the partial loss of red light from the element 20b may be made up by the addition of red light from the element 20a. Thus, the viewer sees the additional element 20a along the line of sight C even through the line of sight B is partially occluded by the matrix 12.

Similarly, a viewer viewing from the opposite side of the opening 14 may have only an occluded view of the blue color producing element 22a. However, this occlusion may be overcome because the extra blue color producing element 22b may be visible in such case.

When a pixel made up of the elements 20b, 24 and 22a is viewed straight on, the viewer may not view the elements 22b and 22a (which, in such case, are unnecessary). When the viewer views from an angle that causes occlusion of either the element 22a or the element 20b, the additional element 20a or 22b may then become visible and may compensate for chromatic shift and/or luminance loss resulting from the parallax problem.

In some embodiments, the extra blue element 22b and the extra red element 20a need not be of the same size as the elements 20b and 22a. Since, generally, the elements 20b and 22a are only partially occluded, only a partial compensating light source may be needed in some embodiments.

In some embodiments of the present invention, the red color producing element 20a and the red color producing element 20b may be driven by the same red color driver 24. Similarly, a blue color driver 26 may drive both blue color producing elements 22a and 22b so separate drive systems are not needed for the extra elements 20a and 22b. In addition, in such a system, if the lines are of similar lengths, the elements 22b and 22a may be driven at exactly the same time as the elements 22a and 20b. A green color element 24, which in one embodiment may be centrally located, may driven by a green driver 28.

Of course, the orientation of the color producing elements 20, 22 and 24 may be changed in other embodiments. In addition, different colors may be utilized in systems which use different color spaces.

Since the added elements 20a and 22b are generally completely occluded when the display 10 is viewed straight on, the inclusion of these extra elements 22b and 20a may not significantly increase the size of a display 10 or increase the size of the matrix 12, in some embodiments. Thus, the luminance and/or chrominance roll off may be improved without significantly increasing display 10 or matrix 12 size, in some embodiments of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A display comprising:
   a tile that includes elements that produce a plurality of colors including at least first and second colors; and
   a matrix that partially overlays said tile and occludes the view of either the first or the second color produced by said elements, said tile including first and second extra elements, said first extra element being viewable when said one element is occluded, said first extra element being hidden when said one element is not occluded, said second extra element being viewable when another of said elements is occluded, said second extra element being hidden when another of said elements is not occluded.

2. The display of claim 1 including a plurality of tiles meeting along joints, said matrix overlaying said joints.

3. The display of claim 2 wherein said elements are formed in a first layer, and a substantially transparent layer is positioned between said first layer and said matrix.

4. The display of claim 1 wherein said matrix includes openings of sufficient size such that each opening exposes a single pixel made up of color producing elements that produce three different colors.

5. The display of claim 4 wherein said extra element is positioned under said matrix.

6. The display of claim 4 including three color producing elements that produce light of three colors, including a central color producing element and a first and second lateral color producing element on each side of said central color producing element, said display further including a first duplicate color producing element that produces the color of said first lateral color producing element and a second duplicate color producing element that produces the color of said second lateral color producing element, said first duplicate color producing element being positioned oppositely of said central color producing element with respect to the first lateral color producing element.

7. The display of claim 1 wherein said elements are emissive color producing elements.

8. The display of claim 7 wherein said emissive color producing elements are light emitting devices.

9. The display of claim 8 wherein said emissive color producing elements are organic light emitting devices.

10. The display of claim 8 wherein said emissive color producing elements are inorganic light emitting devices.

11. The display of claim 1 wherein said elements are contrast enhancing color producing elements.

12. A method comprising:
    producing a tiled display including a plurality of tiles;
    applying a matrix over said tiles to cover joints between adjacent tiles and to form a plurality of pixel sized openings over each tile;
    aligning a pixel in each opening including at least three subpixels; and
    providing an extra subpixel on each side of said pixel which is viewable when one of said subpixels is at least partially occluded.

13. The method of claim 12 including providing an extra subpixel on both sides of said pixel, said extra subpixels being visible from angles from which one of said subpixels is partially occluded.

14. The method of claim 13 including positioning said extra subpixels under said matrix.

15. The method of claim 14 including providing an extra red subpixel adjacent said blue subpixel.

16. The method of claim 15 including forming said extra subpixels of a size smaller than said subpixels.

17. The method of claim 12 including forming red, green and blue subpixels, said red and blue subpixels being positioned on either side of said green subpixel, and providing an extra blue subpixel adjacent said red subpixel.

18. A tiled display comprising:
    a plurality of tiles, said tiles being butted together along joints;
    a matrix that overlaps said joints and defines pixel-sized openings over said tiles;
    a pixel formed in said tile, arranged in one of said openings;
    said pixel including three subpixels; and
    said pixel including two extra subpixels, one of said two extra subpixels viewable when one of said subpixels is occluded by said matrix.

19. The display of claim 18 wherein each of said three subpixels produces light of a different color and each of said two extra subpixels produces light of a different one of said colors.

20. The display of claim 19 wherein each of said extra subpixels produces light that duplicates the light of one of said subpixels, said extra subpixels positioned in said pixel in an opposed position with respect to the subpixel whose color is duplicated by said extra subpixel.

21. The display of claim 20 wherein said extra subpixels are positioned under the matrix.

* * * * *